United States Patent [19]

Zuccato

[11] Patent Number: 4,867,922
[45] Date of Patent: Sep. 19, 1989

[54] METHOD OF MAKING STYLING MODELS

[75] Inventor: Giuliano M. Zuccato, Northville, Mich.

[73] Assignee: Ford Motor Company, Dearborn, Mich.

[21] Appl. No.: 947,072

[22] Filed: Dec. 29, 1986

[51] Int. Cl.$^4$ .................. B29C 33/38; B29C 33/42
[52] U.S. Cl. .................... 264/40.1; 264/219; 264/257; 264/317; 264/DIG. 39; 364/474.05; 434/82
[58] Field of Search ............... 114/65 R; 156/64, 153, 156/154; 364/474, 475, 476; 264/162, 219, 163, 317, 139, DIG. 66, DIG. 39, 40.1, 45.1, 220, 257; 29/407, 423; 434/82, 88; 446/88

[56] References Cited

U.S. PATENT DOCUMENTS

| | | | |
|---|---|---|---|
| 3,932,923 | 1/1976 | Dimatteo | 156/253 |
| 4,393,450 | 7/1983 | Jerard | 364/475 |
| 4,436,684 | 3/1984 | White | 264/219 |
| 4,474,722 | 10/1984 | Martin | 264/219 |
| 4,555,836 | 12/1985 | Martin | 29/428 |

FOREIGN PATENT DOCUMENTS

| | | | |
|---|---|---|---|
| 666257 | 7/1963 | Canada | 434/82 |
| 2935978 | 5/1981 | Fed. Rep. of Germany | 264/219 |

Primary Examiner—James Lowe
Assistant Examiner—Jeremiah F. Durkins, II
Attorney, Agent, or Firm—Daniel M. Stock; Clifford L. Sadler

[57] ABSTRACT

A method of making a styling model of a decorative body portion of an automobile. The internal surfaces facing inwardly with respect to the outer body portion of the automobile are machined in a block of machinable foam. Hardenable glass fiber material is layed up on the internal surfaces and hardened. A layer of epoxy based material is applied over the hardened glass fiber material and upon the exterior surface of the foam. The epoxy based material is hardened and the exterior surface is machined to define the exteriorly visible surfaces of the model.

11 Claims, 5 Drawing Sheets

METHOD OF MAKING STYLING MODELS

BACKGROUND OF THE INVENTION

The present invention relates generally to the styling of automotive vehicles and parts, and more particularly to methods of making models utilized in the process of such styling.

DESCRIPTION OF THE PRIOR ART

The practice in the automotive industry in preparing models for the aesthetic evaluation of vehicles and parts of vehicles has involved and continues to involve the construction of clay models of the vehicles or components. Traditionally, a reduced scale model is fabricated by hand by an artisan and manual and electronic scaling tools, many computer based, are used to provide data used in fabricating full scale models which have been found to provide the best basis for aesthetic evaluation. The fabrication of these full scale models requires long hours of labor by artisans working on a full-size clay model which at least partially involves the hand modeling of a full size clay. This full size clay consists of a massive clay armature formed over a hard shell supporting structure After it is appropriately shaped, its surface configuration provides data for fabricating a hard mold for molding panels which will represent the full size shape of the vehicle or part. This is an extremely laborious, costly and time consuming operation.

Another disadvantage of the traditional method lies in the creation of dimensional translational errors in working from full scale clay to full size molded model. Since artistically creative automotive designers are now provided with the facility of utilizing computer aided design to define the surfaces of vehicles and parts, a quicker and less costly method than the traditional one previously described is considered desirable to permit the evaluation of the potentially greater number of aesthetically pleasing design proposals by automobile manufacturers.

SUMMARY OF THE INVENTION

Responsive to the deficiencies in the prior art exemplified by the traditional method of model making described, a new model making method is provided in which surfaces accurately defined by the author of the design can, through operation of a computer, be milled directly into hard external or internal surfaces of the model. The new method also provides for the complete elimination of a full size clay model and associated mold as well as the massive initial clay armature and its hard shell supporting structure. Substantial savings in materials and time are effected by the method, and the accurate representation of a designer's intent is also ensured.

According to one version of the method of the present invention, these advantages are achieved through the computer controlled milling of a machinable foam block fabricated from Styrofoam material to form a cavity having a base conforming to the inner surface of a vehicle or part. Hardenable glass fiber material is then laid up into the cavity to define that inner surface and a machineable foam material which may be reinforced is then applied over the glass fiber material to have rough surfaces extending beyond the desired external surface of the part. After hardening, computer controlled machining of that rough surface to the dimensions of the outer part accurately defines the outer surface and the vehicle or part can be removed from the machinable foam base to provide an accurate model of the vehicle or part desired.

In another useful version of the method of the present invention, the technique described is combined with a portion of the traditional technique through utilizing the design decisions of an artisan in fabricating a portion of a reduced size clay model to provide the input to a computer controlled machining operation for completing the fabrication of the model either in the scale in which the artisan originally worked or in any other chosen scale.

BRIEF DESCRIPTION OF THE DRAWINGS

Those skilled in the automotive vehicle styling arts will appreciate the advantages of the method of the present invention by reading the following description with reference to the accompanying drawings in which.

DESCRIPTION OF A PREFERRED EMBODIMENT

The model fabrication method of the present invention can be readily appreciated by the following illustration and explanation of the steps to be followed in fabricating a model of a full-size vehicle door.

Figure 1:
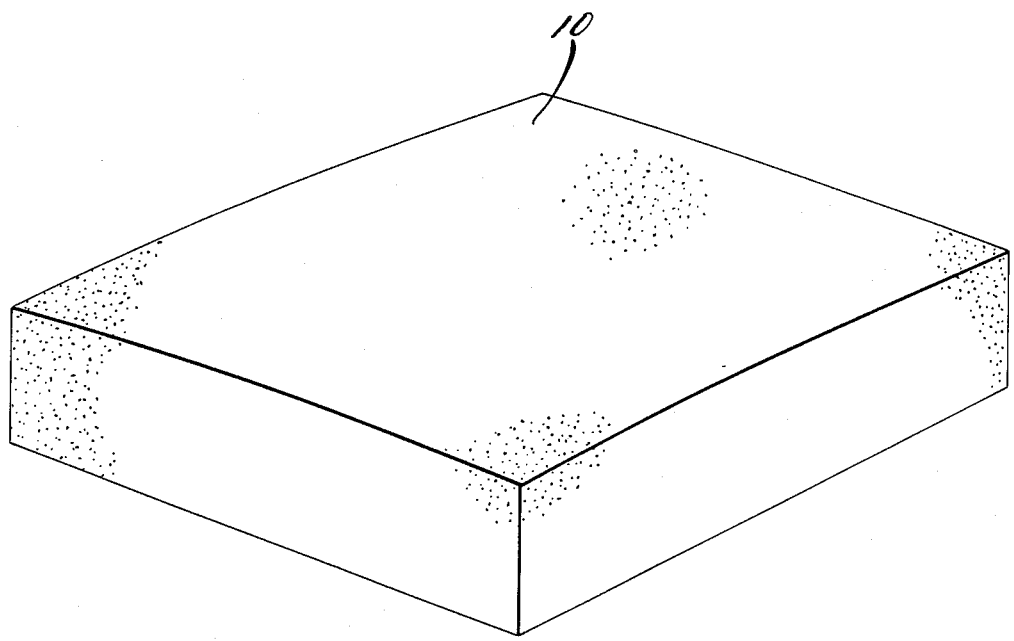
FIG. 1 is a perspective view of a machinable foam block.
Figure 2:
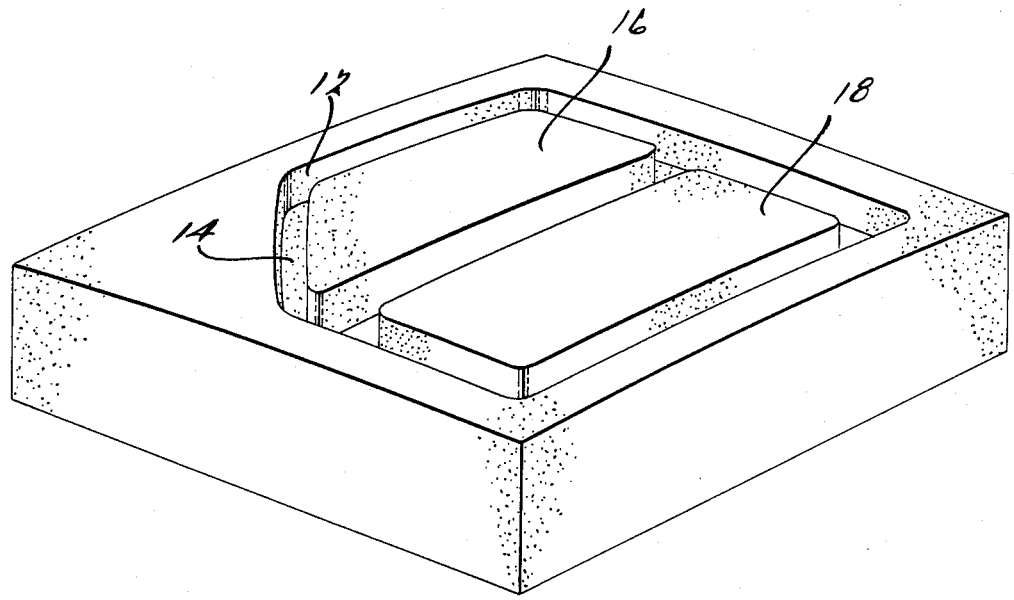
FIG. 2 is a perspective view of the block of FIG. 1 illustrating its condition after milling interior surfaces of a door.
Figure 3:
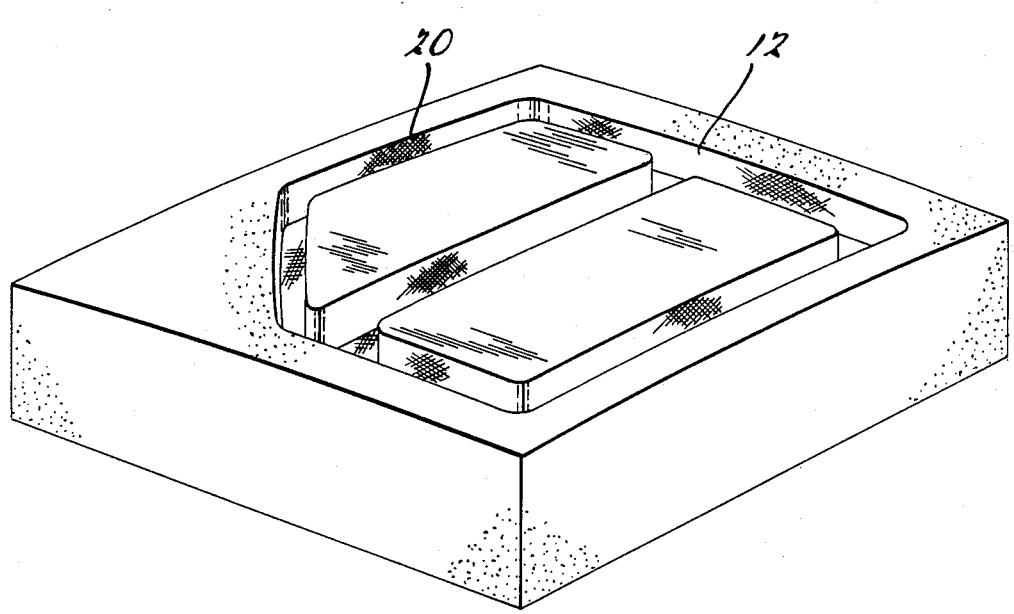
FIG. 3 is a perspective view of the block in a step in which hardenable glass fiber material is applied to the mold of FIG. 2.

Initially, a machinable foam block 10 made from styrofoam material of suitable size and shape to encompass the vehicle door, as shown in FIG. 1, is chosen and a cavity 12 is machined in the block having surfaces such as indicated at 14 which represent the surfaces of a vehicle door facing inwardly with respect to the vehicle. It should be noted in FIG. 2 that portions of the block 10 are left unmachined and such unmachined surfaces may represent through apertures such as a window area indicated generally at 16 or internal cavities for the mounting of mechanical components as indicated generally at 18. Next, as is indicated in FIG. 3, a moldable material 20, such as hardenable glass fiber material suitable for defining a door visible surface for purposes of evaluation, is cast in place in the cavity 12 to provide physical definition of the surfaces milled in the operation whose result is illustrated in FIG. 2.

Figure 4:
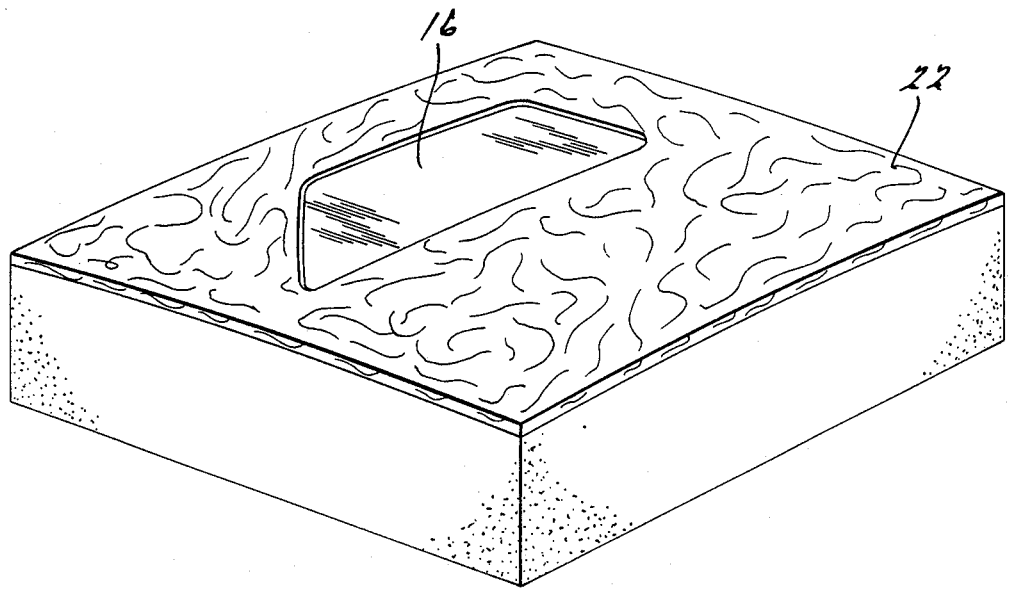
FIG. 4 is a perspective view of the block after application of tooling foam to the block in a condition of FIG. 3.
Figure 5:
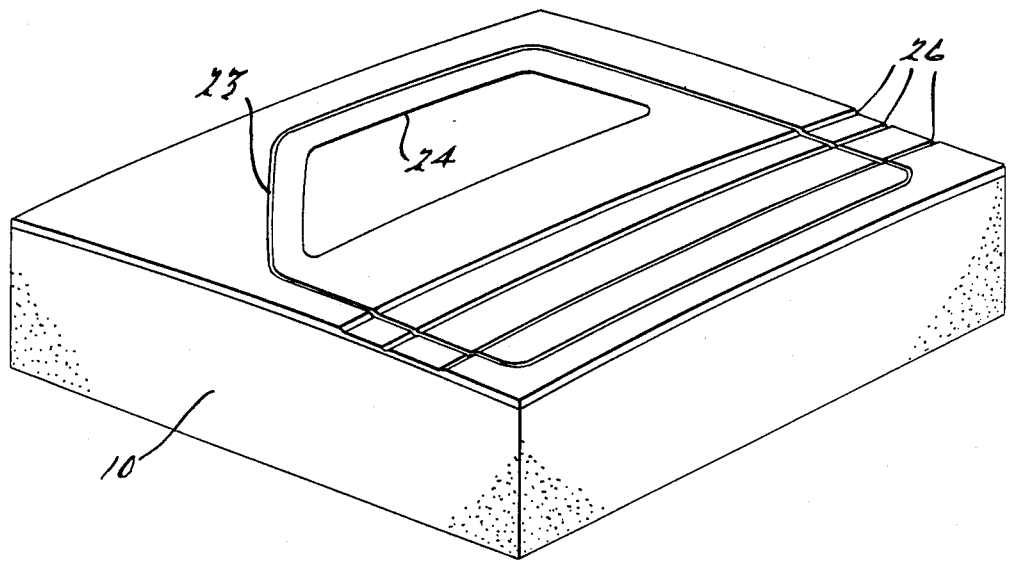
FIG. 5 is a perspective view of the block illustrating the condition in which external surfaces have been milled.
Figure 6:
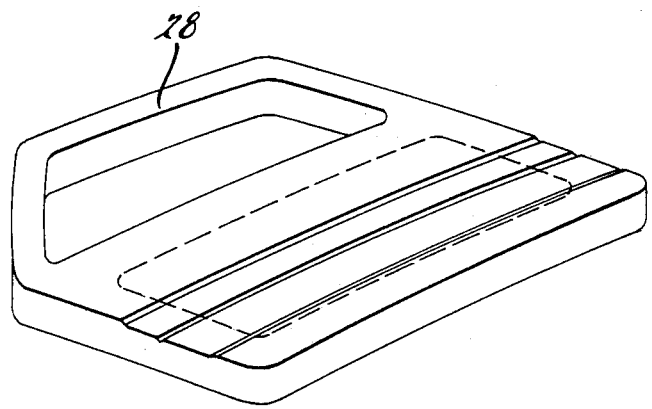
FIG. 6 is a perspective view of the door model removed from the block.

After an appropriate conventional procedure for hardening the moldable material or hardenable glass fiber material 20 has been accomplished, the machinable foam block 10 as is shown in FIG. 4 is covered in all areas in which external surfaces exist with a machinable epoxy based material such as that known as tooling foam. Flexible woven sheets may be included with the tooling foam to provide rigidity in certain areas of large models. The tooling foam layer is illustrated at 22 in FIG. 4. Its thickness is chosen to provide machining stock for defining the external surfaces and will be noted that the window area 16 may be entirely free of tooling foam. After hardening of the tooling foam layer 22, computer controlled milling of its outer surface, the generally upper surface as shown in FIGS. 1–6 takes place, producing an external configuration as generally shown in FIGS. 5 and 6. It can be seen that door edges as indicated at 23 are defined as well as the window aperture periphery 24 and longitudinally extending feature lines as indicated at 26.

Figure 7:
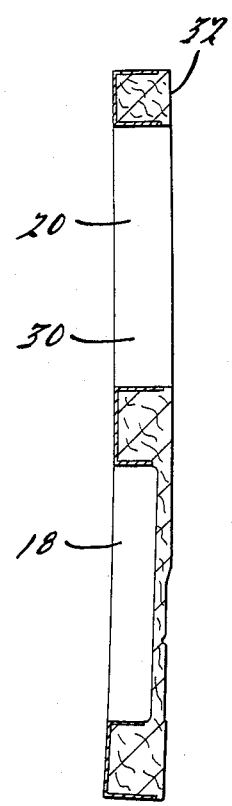
FIG. 7 is a vertical cross-sectional view of the door of FIG. 5.

At this point, a model 28 of an automotive door is complete and can be removed from the machinable foam block 10. As can be seen in FIG. 7, the window aperture 20 is open and a cavity 18 for interior mechanical components is defined. Further considering FIG. 7, it will be appreciated that the method described has defined a unitary article for illustrating the shape of a vehicle door in which computer controlled milling has defined interior surfaces 30 of a hardenable glass fiber material and exterior surfaces 32 of machined tooling foam. A door model thus made is capable of carrying associated componentry such as windows, hinges, locks and related mechanical mechanisms and may be painted to represent the desired appearance. For ease of illustration, the door whose modeling was described in the description of FIGS. 1–6 is a relatively simple shape but those skilled in the art will appreciate that any desired shape of door or other vehicle part could be fabricated using the same method. It is also possible to fabricate a scale or full size model of an entire vehicle using the same method.

Figure 8:
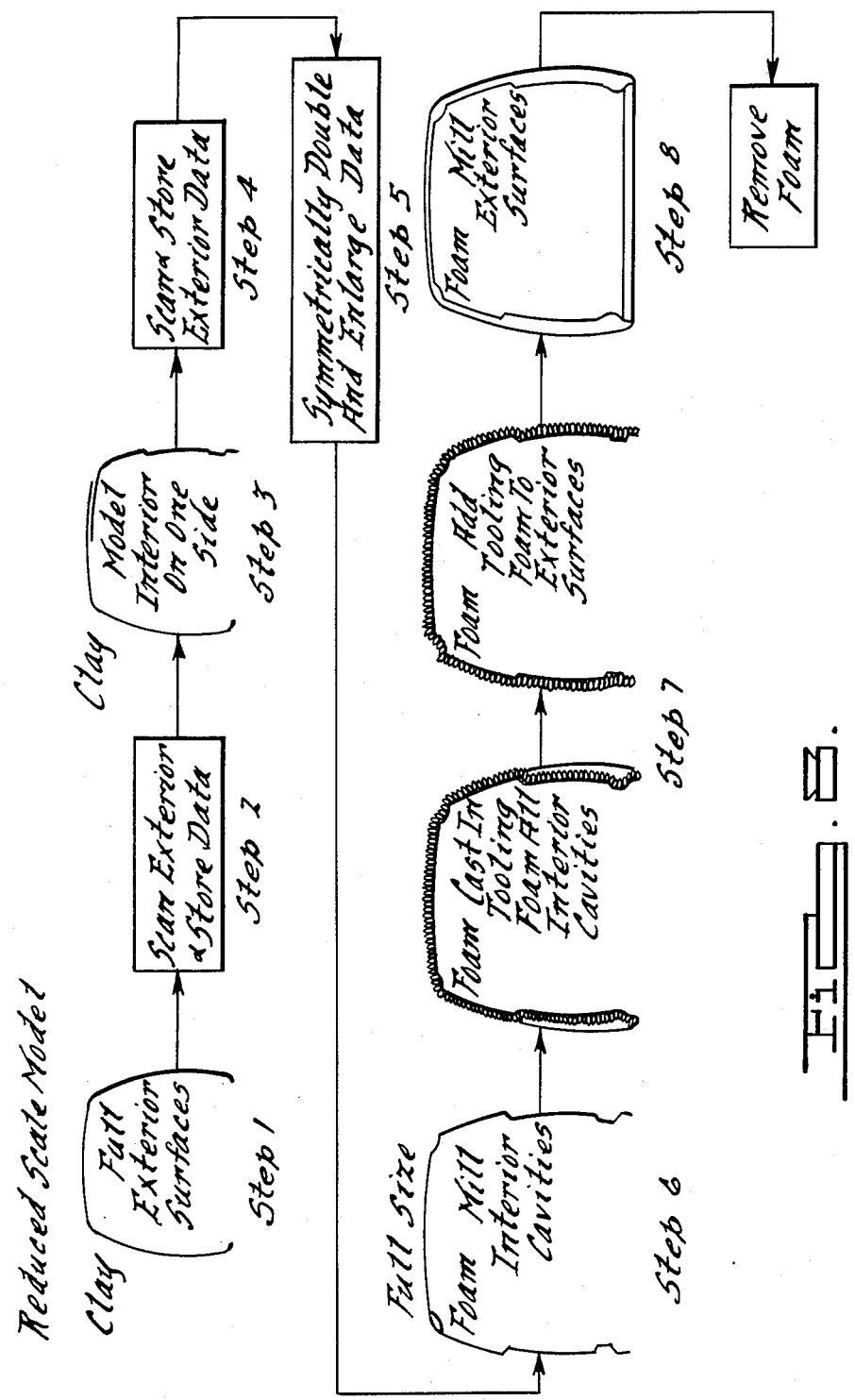
FIG. 8 is a diagrammatic chart showing a variant of the method of the present invention.
Figure 9:
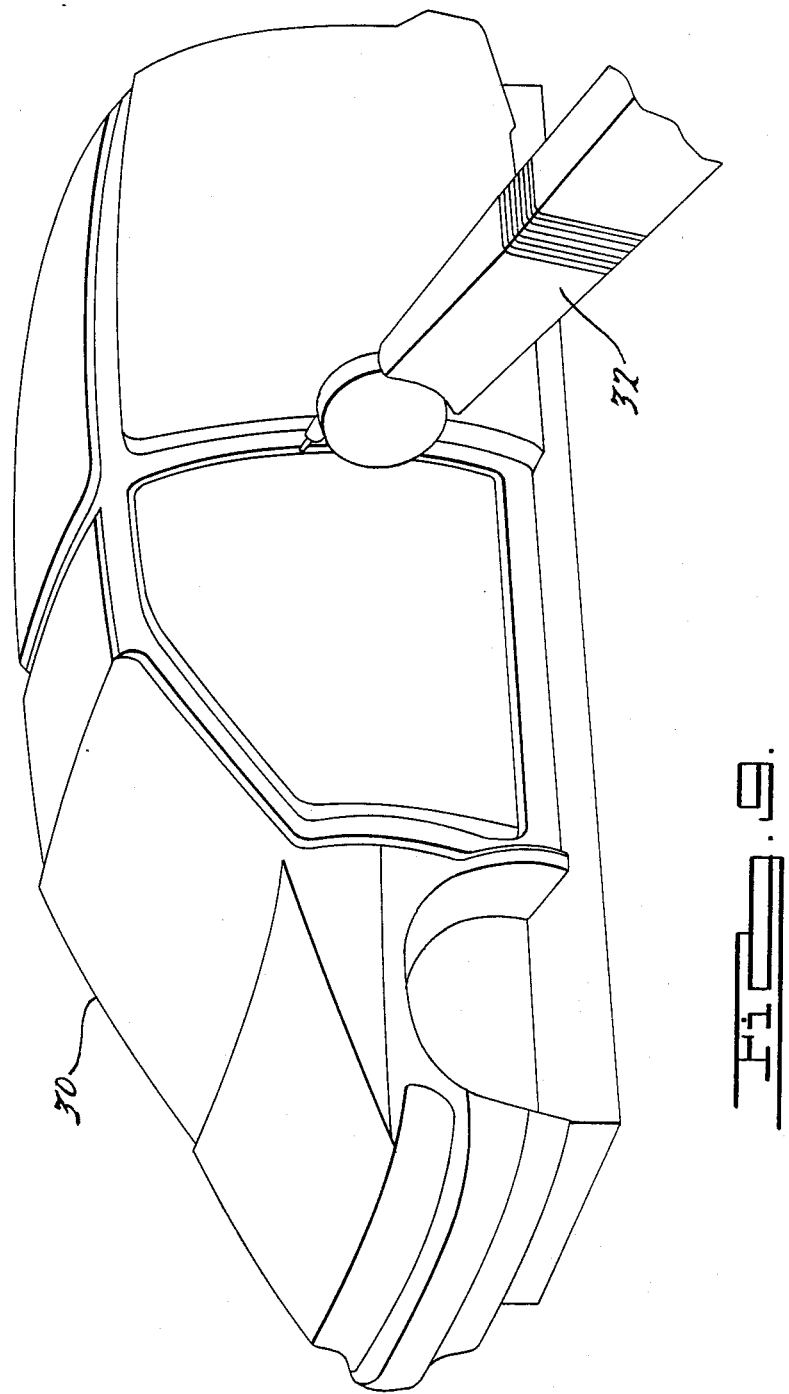
FIG. 9 is a perspective view of a model of a vehicle during machining of its interior surfaces.

Turning now to FIG. 8 and 9, the fabrication of models of entire vehicles is illustrated through presentation of a variant of the method heretofore described. Much of the method to be described in the following, however, could be utilized directly in the previous method described as those skilled in the vehicle modeling arts will appreciate. For example, FIG. 9 illustrates the procedure of milling the interior surfaces into an exteriorly complete clay model 34 using a computer controlled milling machine shown in part at 36.

In this variant method, as illustrated in the chart in FIG. 8, it is provided that beginning with an exteriorly completed clay model, whether that clay model were generated from computer aided design data flowing from the author of the design through the operation of the computer or from an artisan's hands, the remainder of the model can be fabricated and it can be reproduced in any scale desired.

Considering then the steps illustrated in the preferred sequence, it had been found effective to begin as indicated in Step 1 with a clay model of the complete exterior surfaces of a vehicle. Preferably this model would be of a reduced scale such as 3/8:1. This model, of course, represents the external shape proposed by an automotive designer. Electronic measurement techniques are then used on the model to scan the surfaces and store the mathematical information describing the surfaces in known computer controls for measurement in machining. This is indicated in the chart of FIG. 8 in the block labelled "Scan Exterior and Store Data".

Step 3 of the preferred procedure involves the modeling of the interior surfaces of the ⅜ clay model of Step 1. This modeling is preferably effected manually or, alternatively, descriptive data on the interior surface as stored in the computer data base may be utilized to machine these surfaces through computer controlled milling, as is illustrated in the prospective drawing of FIG. 8. Because the aesthetic appreciation of the interior surfaces is generally less important in evaluating a model than the exterior surfaces, this definition of the interior surfaces can be conducted on one side of the vertical symmetric plane of the model.

In Step 4, as indicated by the box labeled "Scan and Store Interior Data" in FIG. 8, the shapes of the interior surfaces of the model may be scanned and doubled by the computer to define the other side of the plane of symmetry. The doubling and enlarging of the data is indicated as a fifth step in the box labelled "Symmetrically Double and Enlarge Data". This step, of course, is unnecessary if the interior surfaces were first generated in a computer aided design sequence, rather than through the hands of an artisan on the clay model.

Having stored the data defining both interior and exterior surfaces of the ⅜ clay model and given a machinable foam block of sufficient size to encompass the entire volume of a vehicle in full size, it is possible to translate the data generated into full size surface definition and to mill, as is indicated in Step 6, all the interior cavities so defined into the block of foam. A hardenable glass fiber material or tooling foam may then be laid up on these surfaces in the manner described before and allowed to harden.

In Step 7, further tooling foam is added over the material used to form the interior surfaces. And finally, in Step 8, the exterior surfaces are milled, using the stored exterior data. Removal of the remaining foam yields a full-size model of the vehicle.

It will be appreciated that this variant procedure provides for the utilization of artistic input to the design sequence other than that generated in the computer aided design system, but otherwise takes advantage of the previously described fast, simple and economic method of creating a model.

While only two variants in the method to be employed in the production of styling models has been shown and described here, others may be possible without departing from the scope of the appended claims.

What is claimed is:

1. A method of making a styling model of a decorative outer body portion of an automobile comprising the steps of:

providing a block of machinable foam material;

machining surfaces in the block corresponding to desired internal surfaces of the styling model representing those surfaces facing inwardly with respect to the automobile outer body portion and not visible from the exterior thereof;

laying up hardenable glass fiber material on the machined surfaces;

hardening the glass fiber material;

applying a layer of machinable epoxy based material over the glass fiber material and outer surfaces of the block corresponding to exteriorly visible outer surfaces of the decorative outer body portion;

hardening the epoxy based material;

machining the epoxy based material to define the exteriorly visible surfaces of the model; and separating the model from the unmachined portion of the foam block.

2. The method of claim 1 wherein the machining of interior and exterior surfaces is effected through a step comprising a computer controlled milling step in which design data defining the surfaces is stored and utilized to control the machining.

3. The method of claim 1 wherein the epoxy based material is chosen to be tooling foam.

4. The method of claim 2 wherein the epoxy based material is chosen to be tooling foam.

5. The method of claim 3 and further comprising a step of adding a flexible woven reinforcing material to the tooling foam during the applying step.

6. The method of claim 4 and further comprising a step of adding a flexible woven reinforcing material to the tooling foam during the applying step.

7. A method of making a styling model of the body of an automobile comprising the steps of:
creating a reduced scale clay model of an automobile having substantially completely defined external surfaces;
electronically scanning the reduced scale model to measure and store data representative of the exterior surfaces;
removing clay from one symmetrical side of the reduced scale model to define interior surfaces of the styling model representing those surfaces facing inwardly with respect to the body external surfaces and not visible from the exterior thereof;
electronically scanning the reduced scale model to measure and store data representative of the interior surfaces of the modeled automobile body;
symmetrically reproducing the data to define the other symmetrical side of the model interior surfaces;
providing a block of machinable foam material of a size larger than the desired size of the automobile model;
machining the interior surfaces defined in the second scanning step and the symmetrically reproducing step;
laying up hardenable glass fiber material on the interior surfaces;
allowing glass fiber material to harden;
laying up an epoxy based machinable material on the glass fiber material and outer surfaces of the block corresponding to exteriorly visible outer surfaces of the styling model;
hardening the epoxy based material;
machining the epoxy based material to provide all exteriorly visible surfaces defined in the first scanning step; and
separating the model from the unmachined portion of the foam block.

8. A method as defined in claim 7 and further comprising a computing step for translating the data collected in the first and second scanning steps into data representative of exterior and interior surfaces of a full scale automobile body and prior to the machining steps.

9. A method as defined in claim 7 wherein the creating and removing steps are effected by the manual formation of the clay from which the reduced scale model is fabricated.

10. A method as defined in claim 8 wherein the creating and removing steps are effected by the manual formation of the clay from which the reduced scale model is fabricated.

11. A method of making a styling model of portions of the body of an automobile comprising the steps of:
creating and storing data representative of the exteriorly visible surfaces of the body portions;
creating and storing data representative of the interior surfaces of the body portions not visible from the exterior thereof;
providing a block of machinable foam material of a size larger than a desired size of the automobile body portion;
machining all interior surfaces defined by the data stored in the second creating and storing step into the block;
laying up hardenable glass fiber material on the interior surfaces;
allowing glass fiber material to harden;
laying up an epoxy based machinable material on the glass fiber material and outer surfaces of the block corresponding to outer surfaces of the body portions;
hardening the epoxy based material;
machining the epoxy based material to provide all exterior surfaces defined by the data stored in the first creating and storing step; and
separating the model from the unmachined portion of the foam block.

* * * * *